(12) United States Patent
Kogan et al.

(10) Patent No.: US 7,975,187 B2
(45) Date of Patent: Jul. 5, 2011

(54) METHOD AND APPARATUS FOR MEASURING CUSTOMER IMPACTING FAILURE RATE IN COMMUNICATION NETWORKS

(75) Inventors: Yaakov Kogan, Morganville, NJ (US); Rajesh Patki, San Jose, CA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 261 days.

(21) Appl. No.: 12/272,869

(22) Filed: Nov. 18, 2008

(65) Prior Publication Data
US 2010/0125745 A1     May 20, 2010

(51) Int. Cl.
*G06F 11/00* (2006.01)
(52) U.S. Cl. ............................................. 714/48; 714/50
(58) Field of Classification Search ...................... 714/48
See application file for complete search history.

(56) References Cited

U.S. PATENT DOCUMENTS

| | | | |
|---|---|---|---|
| 6,490,621 B1* | 12/2002 | Forget et al. ................. | 709/224 |
| 6,594,786 B1* | 7/2003 | Connelly et al. ................. | 714/50 |
| 6,651,137 B2* | 11/2003 | Baek et al. ..................... | 711/114 |
| 6,704,289 B1* | 3/2004 | D'Souza et al. ............... | 370/252 |
| 6,839,852 B1* | 1/2005 | Pantuso et al. .................. | 726/11 |
| 6,928,580 B2* | 8/2005 | Pedone et al. ..................... | 714/7 |
| 7,149,917 B2* | 12/2006 | Huang et al. ...................... | 714/4 |
| 2003/0115508 A1* | 6/2003 | Ali et al. .......................... | 714/43 |
| 2003/0149919 A1* | 8/2003 | Greenwald et al. ............. | 714/43 |
| 2007/0028147 A1* | 2/2007 | Huang et al. .................... | 714/43 |
| 2009/0171703 A1* | 7/2009 | Bobak et al. ....................... | 705/7 |

* cited by examiner

*Primary Examiner* — Scott T Baderman
*Assistant Examiner* — Kamini Patel

(57) ABSTRACT

A method and system for measuring a customer impacting failure rate in a communication network are disclosed. For example, the method collects a plurality of customer impacting network failure events, where the plurality of customer impacting network failure events comprises both hardware failure events and software failure events associated with a particular type of router or switch, or a particular type of component of the router or the switch. The method computes a Mean Time Between Outage (MTBO) metric from the plurality of customer impacting network failure events and compares the MTBO metric with a MTBO goal metric, wherein the MTBO goal metric is calculated in accordance with a predicted Mean Time Between Failure (MTBF) metric.

20 Claims, 3 Drawing Sheets

METHOD AND APPARATUS FOR MEASURING CUSTOMER IMPACTING FAILURE RATE IN COMMUNICATION NETWORKS

The present invention relates generally to communication networks and, more particularly, to a method and apparatus for measuring customer impacting failure rate in communication networks, e.g., packet networks such as Internet Protocol (IP) networks, Multi-Protocol Label Switching (MPLS) networks, Frame Relay (FR) networks, Asynchronous Transfer Mode (ATM) networks, Internet Protocol (IP) Multimedia Subsystem (IMS) networks, and the like.

BACKGROUND OF THE INVENTION

Routers and switches deployed in packet networks consist of many hardware components. Reliability of each hardware component is characterized by predicted Mean Time Between Failures (MTBF) provided by vendor. In large networks the frequency of replacements for a given component can be used to calculate the field MTBF for some time period T (e.g., one month). The service provider can compare the field MTBF (actual MTBF of the component as observed in the field) and the predicted MTBF and request corrective actions from the vendor if the field MTBF is below the predicted MTBF. Repeated component failures with automatic recovery and software failure are not counted in the field MTBF although these failures are impacting customers. Therefore, the field MTBF metric does not accurately reflect the reliability of network service supported by the underlying network equipment.

SUMMARY OF THE INVENTION

The present invention discloses a method and system for measuring a customer impacting failure rate in a communication network. For example, the method collects a plurality of customer impacting network failure events, where the plurality of customer impacting network failure events comprises both hardware failure events and software failure events associated with a particular type of router or switch, or a particular type of component of the router or the switch. The method computes a Mean Time Between Outage (MTBO) metric from the plurality of customer impacting network failure events and compares the MTBO metric with a MTBO goal metric, wherein the MTBO goal metric is calculated in accordance with a predicted Mean Time Between Failure (MTBF) metric.

BRIEF DESCRIPTION OF THE DRAWINGS

The teaching of the present invention can be readily understood by considering the following detailed description in conjunction with the accompanying drawings, in which.

To facilitate understanding, identical reference numerals have been used, where possible, to designate identical elements that are common to the figures.

DETAILED DESCRIPTION

Figure 1:
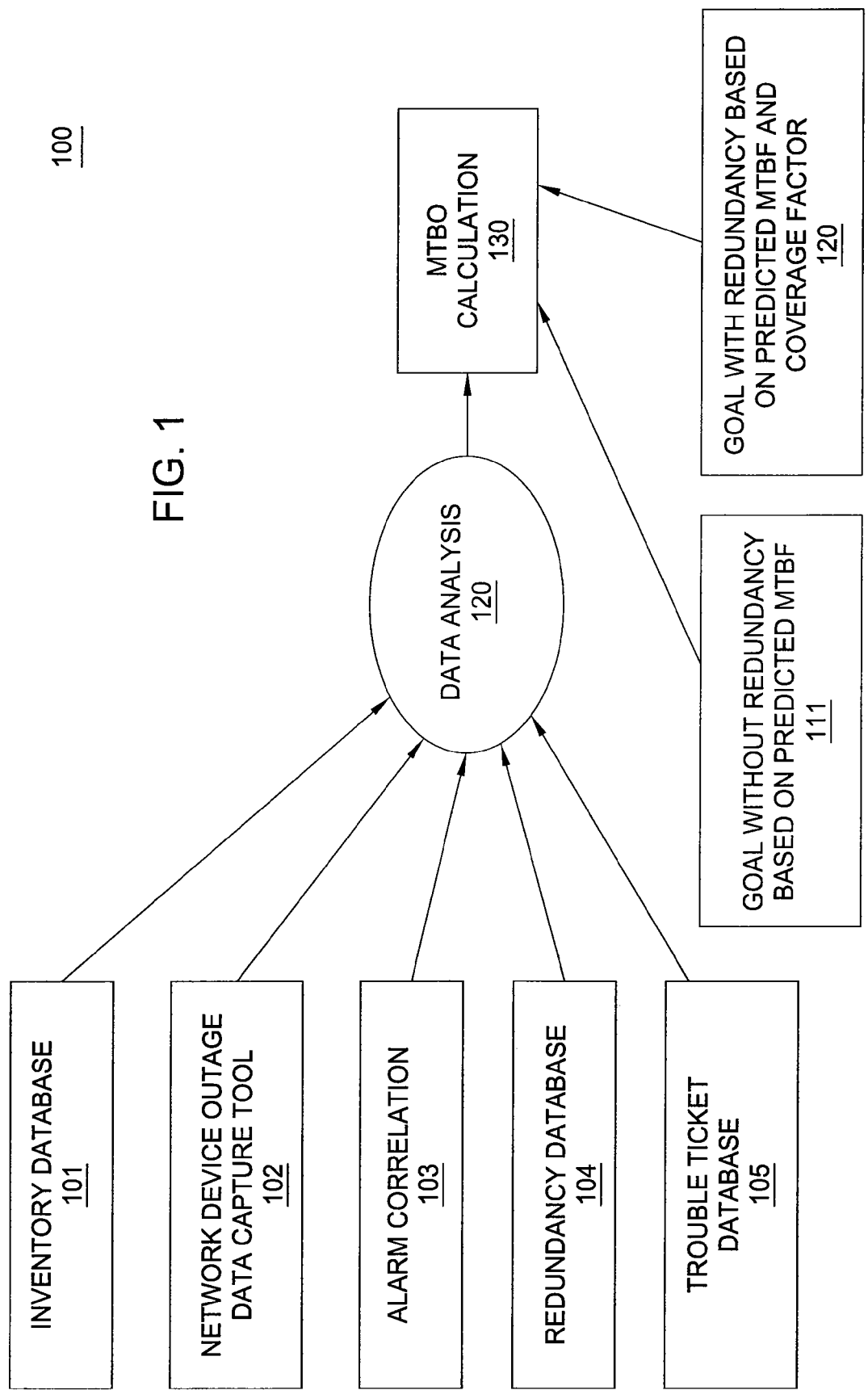
FIG. 1 illustrates an overall customer impacting failure measurement architecture related to the present invention.

The Mean Time Between Failures (MTBF) metric has been traditionally used to determine the reliability of network equipment in service provider networks. MTBF is the mean (average) time between failures of a system component. This metric counts only hardware failures resulting in component replacement. Actual failure patterns are more sophisticated. In particular, a card in a router or a switch may fail and recover automatically several times, there are failures that affect many cards simultaneously, and software failures may also have major impacts on the reliability of network equipment. Thus, the MTBF does not accurately reflect the reliability of network service supported by the underlying network equipment.

To accommodate this level of complexity, in one embodiment of the present invention, it is advantageous to examine a new reliability metric for measuring the frequency of customer impacting failures caused by network equipment in both hardware and software. To address this need, the present invention introduces a new reliability metric, Mean Time Between Outages (MTBO), to track the reliability of communication network equipment, such as packet based network equipment, including, but not limited to IP routers, FR switches, ATM switches and the like. The present invention using the MTBO metric registers all customer impacting failures caused by both hardware and software related failures.

In one embodiment, the inverse rate of all customer impacting failures of network equipment caused by hardware and software over a predetermined period of time, e.g., one month, is referred to as Mean Time Between Outages (MTBO). In one embodiment, the MTBO metric can be compared with a respective goal which is calculated based on vendor's MTBF predictions for components of the network equipment and redundancy arrangement. The present invention would benefit service providers and vendors by providing a mutually agreeable list of all network equipment related failures and metric that accurately captures the overall reliability of the network equipment in terms of customer service impacting events.

To facilitate understanding, the term "network equipment" is used to refer to a network element, such as a router and/or a switch, and the term "network equipment component" is used to refer to a component within a piece of network equipment, such as a card within the router and/or switch, e.g., a line card, a controller card, or a route processor card.

In one embodiment using an IP router component, such as non-redundant access line cards used to connect to customer sites, as an illustrative example of a customer service impacting network equipment component for a particular type of network equipment, such as an IP router, a failure rate and an MTBO (an inverse failure rate) metrics can be defined as follows:

For a particular type of an IP router let:
N=Total number of access line cards in the network.
x=Number of failures caused by access line card failures alone (e.g., also known as single access line card failures) over a predetermined time period T (e.g., T=one month)
y=Number of "equivalent" access line card failures caused by entire router failure that disables all line cards in the router over the same time period T.

Then, the total number F of equivalent access line card failures can be expressed as:

$$F = x + y$$

The access line card Failure Rate and MTBO (Inverse Failure Rate) over a period of time T can then be expressed as:

$$\text{Failure Rate} = \frac{F}{NT} \text{ and } MTBO = \frac{NT}{F}$$

respectively.

In case of redundant access line cards there are a primary card and a backup card to which the connection is switched when the primary card fails. For MTBO calculation, only primary cards are counted in N and y while x counts only those failures of primary cards for which switchover to the backup card did not occur instantaneously.

In another embodiment of the present invention, the MTBO goal is provided. The following notation is used:
$m_{LC}$=Predicted MTBF for access line card
$m_{RP}$=Predicted MTBF for route processor (RP) card
c=Coverage factor (probability of successful switchover to the backup card when the primary card fails). Coverage factor c, 0<c<1, is provided by a vendor and c=0.99 is considered as an acceptable coverage. We assume the same coverage factor for LC and RP.

We consider the following three cases of redundancy:
1. Both LC and RP are not redundant or there is redundancy but switchover to the backup card is not instantaneous for both LC and RP:

$$MTBO\ GOAL = (1/m_{LC} + 1/m_{RP})^{-1} = \frac{m_{LC}m_{RP}}{m_{LC} + m_{RP}}$$

2. RP is redundant with instantaneous switchover to the backup card but LC is not redundant or LC is redundant but the switchover to the backup card is not instantaneous:

$$MTBO\ GOAL = (1/m_{LC} + (1-c)/m_{RP})^{-1}$$

$$= \frac{m_{LC}m_{RP}}{m_{LC}(1-c) + m_{RP}} \approx m_{LC}$$

3. Both LC and RP are redundant with instantaneous switchover to the backup card:

$$MTBO\ GOAL = ((1-c)/m_{LC} + (1-c)/m_{RP})^{-1}$$

$$= \frac{m_{LC}m_{RP}}{(1-c)(m_{LC} + m_{RP})}$$

The recording and estimation of the MTBO (inverse failure rate) for customer facing line cards offers a convenient method to track network reliability. This is because:
hardware or software malfunction of individual line card as well as card reset with automatic recovery represents a single line card failure;
a failure of an entire router represents all line cards on that router are assumed to have failed;
simultaneous failure of all uplink cards of the router represents all line cards on that router are assumed to have failed;

To better understand the present invention, FIG. 1 illustrates an overall customer service impacting failure measurement architecture 100 related to the present invention applied separately to a particular type of router or switch platform. The various components in FIG. 1 contribute to an accurate measurement and assessment of a customer impacting failure rate of communication network equipment, such as internet protocol (IP) routers, asynchronous transfer mode (ATM) switches, frame-relay switches, and the like.

Inventory database 101 is a database that is maintained on a server and contains the detailed data about the number of network equipment components in the network for a particular type of router or switch platform. For example, network equipment components include, but are not limited to, interface cards (broadly referred to as line cards), route processor cards, and switch controller cards, etc. for each router and switch in the network. The database provides the equipage (inventory) information of network equipment in a network. For example, the database provides card types in each slot within a chassis of a piece of network equipment. Each line card has attributes that allow us to distinguish between uplink and customer facing (access) cards. Access cards without customers are marked appropriately. This data is updated on a regular basis, e.g., weekly, to truly reflect the inventories in the production network.

Network device outage data capture tool 102 registers and records network equipment outage data from network equipment logs or flash disks using the following failure related data:
Network equipment crash or reset data regarding the nature of the problem that caused the network equipment to fail as registered on the storage disk on the device, which can be read at later time.
Historic data stored in the network equipment for all the events seen, like syslog (system log) archive or Simple Network Management Protocol (SNMP) trap archive, etc.
Automated scripts for network equipment component such as line cards and route processor card can accurately track short duration failures where line cards self-recover from errors such as parity errors.

In the event that the network equipment component in question such as a line card crashes, the vendor provided automated scripts may not record the failures. In such cases, the service provider Syslog system can record the failure event. These logs provide a view of failures that have occurred in the network equipment that will be further analyzed to identify customer impacting failure events. Various network device syslog (system log) messages that indicate problems in both the hardware and the software within the network equipment are captured and analyzed for customer impacting failures.

Alarm Correlation or Generation module 103 includes the SNMP traps generated by the network device and the SNMP polling data that indicates network equipment problems. These traps or alarms are captured and analyzed for customer impacting failure.

Redundancy database 104 is a database that stores network equipment components that are protected by standby arrangement with indication of switchover time (instantaneous or not instantaneous).

Trouble Ticket database 105 is a database of the trouble tickets opened by the customer on a specific network equipment platform of a specific network equipment vendor. This database is particularly useful in situation where a network device is replaced and all historic data stored on the network device is lost. By analyzing this database, the history of customer impacting failures can be analyzed.

Goal without redundancy module 111 calculates the expected MTBO goal of the network equipment using the predicted MTBF data provided by the network equipment vendor. This applies to equipment or component not protected by redundancy arrangement.

Goal with redundancy module 112 calculates the expected MTBO goal of the network equipment using the predicted MTBF, redundancy arrangement, and the coverage factor data provided by the network equipment vendor. Note that coverage factor represents the probability of a successful switchover from a failed network equipment component to a standby network equipment component. This applies only to component(s) protected by redundancy arrangement with instantaneous switchover to the backup component in case of the primary component failure.

Data analysis module 120 provides failure classification to determine and categorize whether a particular failure in the network equipment is a customer impacting failure. Module 120 uses information collected by modules 101 to 105 for calculating two parameters in the MTBO formula: the total number of customer facing cards N and the total number F of equivalent line card failures with customer impact. For example, N is calculated from data presented in modules 101 and 104 using the following rules: (1) Access line cards without customers are excluded from the calculation; (2) Only primary access cards are counted in case of redundancy. For example, F is calculated based on data collected in modules 101-105 as follows. An initial list of single access card failures and list of entire router or switch failures caused by hardware and software during given time period T are extracted from module 105. The number of equivalent access cards failures is calculated using data presented in modules 101 and 104. Modules 102 and 103 may provide additional failures that are not captured in module 105. Only failures of access cards with customers which occurred outside of the maintenance window are added to the initial list of failures.

Module 130 (e.g., implemented on an application server) uses the parameters N and F identified in module 120 to calculate the MTBO metric. In addition, module 130 also compares actual MTBO with the respective reliability goal provided by modules 111 and 112 to determine whether the actual MTBO (as calculated by module 130) is below the goal.

Figure 2:
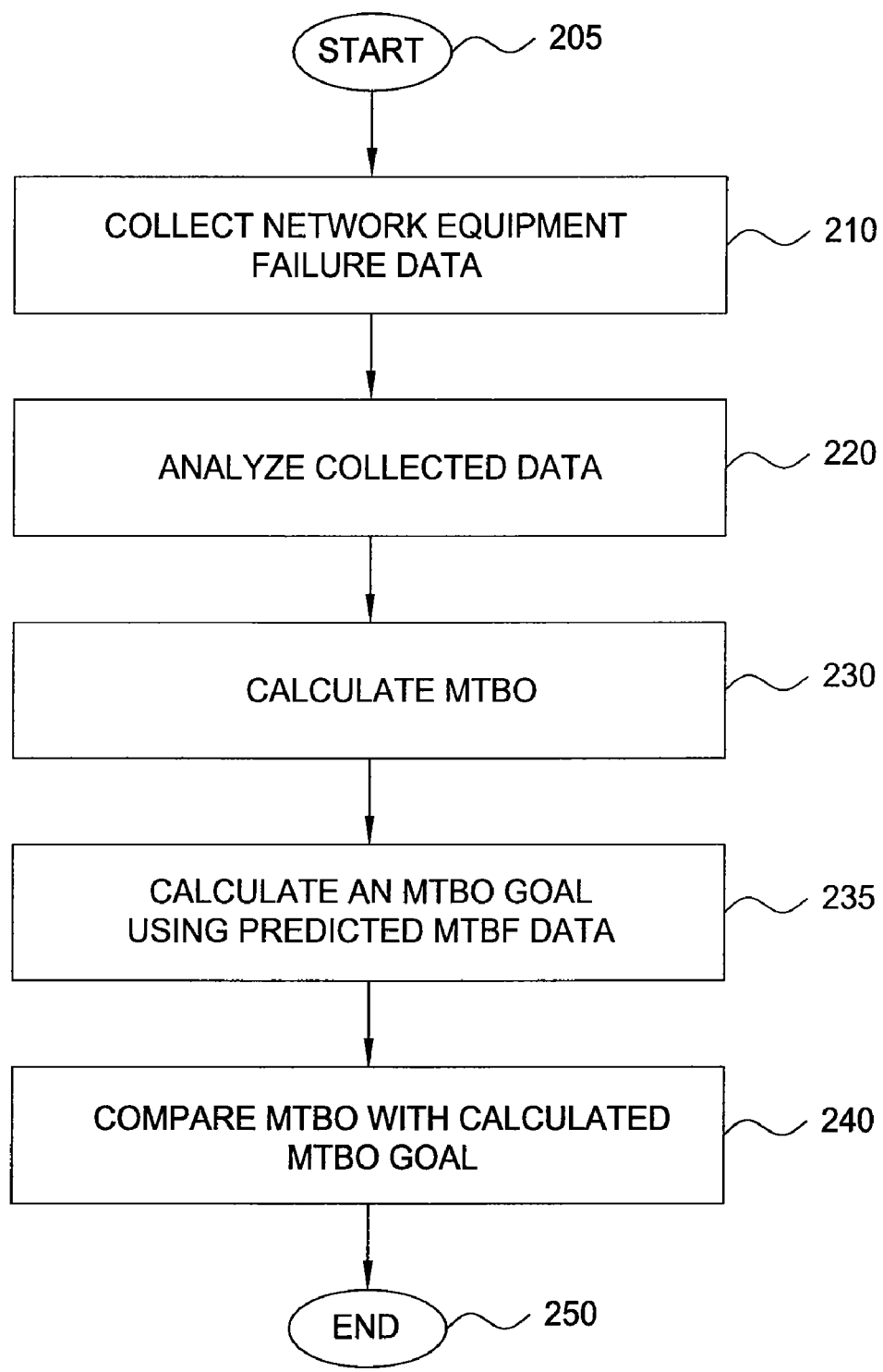
FIG. 2 illustrates a flowchart of a method for generating the MTBO metric in a packet network of the present invention.

FIG. 2 illustrates a flowchart of a method 200 for generating the MTBO metric of the present invention. For example, one or more steps of method 200 can be implemented by the MTBO calculation module 130 as discussed above. Method 200 starts in step 205 and proceeds to step 210.

In step 210, the method collects network equipment failure information from multiple sources. The sources include, but are not limited to, inventory database 101, network device outage data capture tool 102, alarm correlation or generation module 103, redundancy database 104, and trouble ticket database 105 as described previously.

In step 220, the method analyzes the information collected in step 210 by the various collection modules to determine parameters N and F as it is performed by module 120 described previously.

In step 230, the method calculates the MTBO metric by module 130 based on parameters identified in step 220.

In step 235, the method calculates an MTBO goal of the unprotected network equipment using the predicted MTBF data provided by the network equipment vendor in module 111. In addition, the method calculates the MTBO goals of the protected network equipment using the predicted MTBF and the coverage factor data provided by the network equipment vendor in module 112. Note that coverage factor represents the probability of a successful switchover from a failed network equipment component to a standby network equipment component.

In step 240, the method compares actual MTBO calculated in step 230 with the respective MTBO goal calculated in step 235 by modules 111 and 112 to determine whether the actual MTBO is below the goal. The discrepancy is communicated to the equipment vendor for future improvement purposes. The method ends in step 250.

It should be noted that although not specifically specified, one or more steps of method 200 may include a storing, displaying and/or outputting step as required for a particular application. In other words, any data, records, fields, and/or intermediate results discussed in the method 200 can be stored, displayed and/or outputted to another device as required for a particular application. Furthermore, steps or blocks in FIG. 2 that recite a determining operation, or involve a decision, do not necessarily require that both branches of the determining operation be practiced. In other words, one of the branches of the determining operation can be deemed as an optional step.

Figure 3:
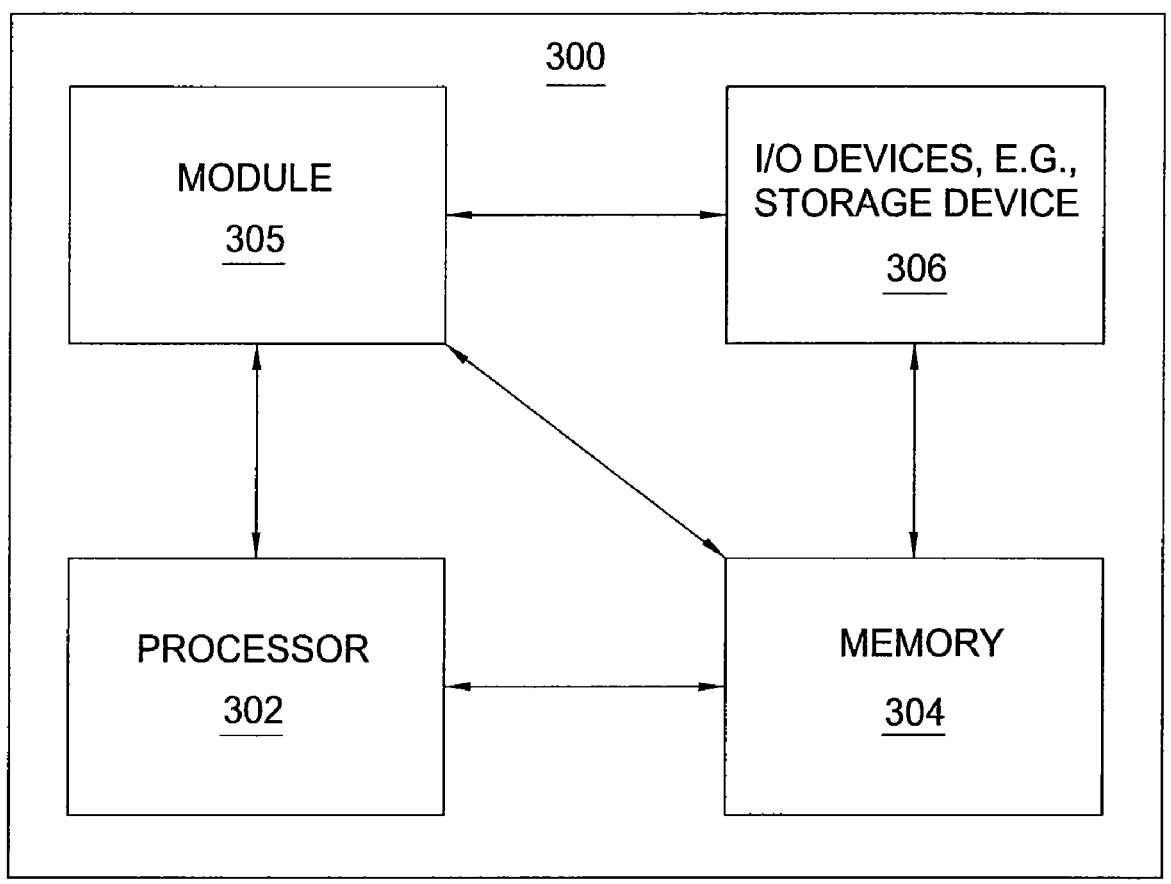
FIG. 3 illustrates a high level block diagram of a general purpose computer suitable for use in performing the functions described herein.

FIG. 3 depicts a high level block diagram of a general purpose computer suitable for use in performing the functions described herein. As depicted in FIG. 3, the system 300 comprises a processor element 302 (e.g., a CPU), a memory 304, e.g., random access memory (RAM) and/or read only memory (ROM), a module 305 for measuring customer impacting failure rate, and various input/output devices 306 (e.g., storage devices, including but not limited to, a tape drive, a floppy drive, a hard disk drive or a compact disk drive, a receiver, a transmitter, a speaker, a display, a speech synthesizer, an output port, and a user input device (such as a keyboard, a keypad, a mouse, and the like)). For example, module 305 may contain a plurality of instructions including instructions which, when executed by a processor, cause the processor to perform steps of a method (e.g., method 200 as discussed above) for measuring a customer impacting failure rate in a communication network.

It should be noted that the present invention can be implemented in software and/or in a combination of software and hardware, e.g., using application specific integrated circuits (ASIC), a general purpose computer or any other hardware equivalents. In one embodiment, the present module or process 305 for measuring customer impacting failure rate can be loaded into memory 304 and executed by processor 302 to implement the functions as discussed above. As such, the present process 305 for measuring customer impacting failure rate (including associated data structures) of the present invention can be stored on a computer readable medium, e.g., RAM memory, magnetic or optical drive or diskette and the like.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A method for measuring a customer impacting failure rate in a communication network, comprising:
   collecting a plurality of customer impacting network failure events, where the plurality of customer impacting network failure events comprises both hardware failure events and software failure events associated with a;
   computing a mean time between outage metric from the plurality of customer impacting network failure events, wherein the mean time between outage metric is expressed as:

$$MTBO\ \text{METRIC} = N \times \frac{T}{F}$$

where, T represents a time period, N represents a total number of access line cards in the communication network for the router, and F represents a total number of equivalent access line card failures during the time period T; and comparing the mean time between outage metric with a mean time between outage goal metric, wherein the mean time between outage goal metric is calculated in accordance with a predicted mean time between failure metric.

2. The method of claim 1, wherein the communication network comprises a packet network.

3. The method of claim 2, wherein the packet network comprises an internet protocol network.

4. The method of claim 1, wherein the collecting comprises:

collecting outage data from a network equipment log.

5. The method of claim 1, wherein the time period, T, is a user configurable parameter.

6. The method of claim 1, wherein the total number of equivalent line card failures F is expressed as:

$$F = x + y$$

where x represents a total number of single access line card failures and y represents a number of equivalent access line card failures caused by an entire failure of the router.

7. The method of claim 1, wherein the collecting comprises:

collecting alarms and traps data from an alarm generation module.

8. The method of claim 1, wherein the collecting comprises:

collecting trouble ticket data pertaining to trouble tickets opened by customers from a trouble ticket database.

9. A method for measuring a customer impacting failure rate in a communication network, comprising:

collecting a plurality of customer impacting network failure events, where the plurality of customer impacting network failure events comprises both hardware failure events and software failure events associated with a router;

computing a mean time between outage metric from the plurality of customer impacting network failure events; and comparing the mean time between outage metric with a mean time between outage goal metric, wherein the mean time between outage goal metric is calculated in accordance with a predicted mean time between failure metric, wherein the mean time between outage goal metric is expressed as:

$$MTBO \text{ GOAL METRIC} = \frac{m_{LC} m_{RP}}{m_{LC} + m_{RP}},$$

where $m_{LC}$ represents a predicted mean time between failure for an access line card, and $m_{RP}$ represents a predicted mean time between failure for a route processor card.

10. A method for measuring a customer impacting failure rate in a communication network, comprising:

collecting a plurality of customer impacting network failure events, where the plurality of customer impacting network failure events comprises both hardware failure events and software failure events associated with a router;

computing a mean time between outage metric from the plurality of customer impacting network failure events; and comparing the mean time between outage metric with a mean time between outage goal metric, wherein the mean time between outage goal metric is calculated in accordance with a predicted mean time between failure metric, wherein the mean time between outage goal metric is expressed as:

$$MTBO \text{ GOAL METRIC} = \frac{m_{LC} m_{RP}}{m_{LC}(1-c) + m_{RP}},$$

where $m_{LC}$ represents a predicted mean time between failure for an access line card, $m_{RP}$ represents a predicted mean time between failure for a route processor card, and c represents a coverage factor.

11. A method for measuring a customer impacting failure rate in a communication network, comprising:

collecting a plurality of customer impacting network failure events, where the plurality of customer impacting network failure events comprises both hardware failure events and software failure events associated with a router;

computing a mean time between outage metric from the plurality of customer impacting network failure events; and comparing the mean time between outage metric with a mean time between outage goal metric, wherein the mean time between outage goal metric is calculated in accordance with a predicted mean time between failure metric, wherein the mean time between outage goal metric is expressed as:

$$MTBO \text{ GOAL METRIC} = \frac{m_{LC} m_{RP}}{(1-c)(m_{LC} + m_{RP})},$$

where $m_{LC}$ represents a predicted mean time between failure for an access line card, $m_{RP}$ represents a predicted mean time between failure for a route processor card, and c represents a coverage factor.

12. A computer-readable medium having stored thereon a plurality of instructions, the plurality of instructions including instructions which, when executed by a processor, cause the processor to perform steps of a method for measuring a customer impacting failure rate in a communication network, comprising:

collecting a plurality of customer impacting network failure events, where the plurality of customer impacting network failure events comprises both hardware failure events and software failure events associated with a router;

computing a mean time between outage metric from the plurality of customer impacting network failure events, wherein the mean time between outage metric is expressed as:

$$MTBO \text{ METRIC} = N \times \frac{T}{F}$$

where, T represents a time period, N represents a total number of access line cards in the communication network for the router, and F represents a total number of equivalent access line card failures during the time period T; and comparing the mean time between outage metric with a mean time between outage goal metric, wherein the mean time between outage goal metric is calculated in accordance with a predicted mean time between failure metric.

13. The computer-readable medium of claim 12, wherein the communication network comprises a packet network.

14. The computer-readable medium of claim 12, wherein the collecting comprises:
   collecting outage data from a network equipment log.

15. The computer-readable medium of claim 12, wherein said time period, T, is a user configurable parameter.

16. The computer-readable medium of claim 12, wherein the total number of equivalent line card failures F is expressed as:

$$F = x + y$$

where x represents a total number of single access card failures and y represents a number of equivalent access line card failures caused by an entire failure of the router.

17. A computer-readable medium having stored thereon a plurality of instructions, the plurality of instructions including instructions which, when executed by a processor, cause the processor to perform a method for measuring a customer impacting failure rate in a communication network, comprising:
   collecting a plurality of customer impacting network failure events, where the plurality of customer impacting network failure events comprises both hardware failure events and software failure events associated with a router;
   computing a mean time between outage metric from the plurality of customer impacting network failure events; and
   comparing the mean time between outage metric with a mean time between outage goal metric, wherein the mean time between outage goal metric is calculated in accordance with a predicted mean time between failure metric, wherein the mean time between outage goal metric is expressed as:

$$MTBO \text{ GOAL METRIC} = \frac{m_{LC} m_{RP}}{m_{LC} + m_{RP}},$$

where $m_{LC}$ represents a predicted mean time between failure for an access line card, and $m_{RP}$ represents a predicted mean time between failure for a route processor card.

18. A computer-readable medium having stored thereon a plurality of instructions, the plurality of instructions including instructions which, when executed by a processor, cause the processor to perform a method for measuring a customer impacting failure rate in a communication network, comprising:
   collecting a plurality of customer impacting network failure events, where the plurality of customer impacting network failure events comprises both hardware failure events and software failure events associated with a router;
   computing a mean time between outage metric from the plurality of customer impacting network failure events; and
   comparing the mean time between outage metric with a mean time between outage goal metric, wherein the mean time between outage goal metric is calculated in accordance with a predicted mean time between failure metric, wherein the mean time between outage goal metric is expressed as:

$$MTBO \text{ GOAL METRIC} = \frac{m_{LC} m_{RP}}{m_{LC}(1-c) + m_{RP}},$$

where $m_{LC}$ represents a predicted mean time between failure for an access line card, $m_{RP}$ represents a predicted mean time between failure for a route processor card, and c represents a coverage factor.

19. A computer-readable medium having stored thereon a plurality of instructions, the plurality of instructions including instructions which, when executed by a processor, cause the processor to perform a method for measuring a customer impacting failure rate in a communication network, comprising:
   collecting a plurality of customer impacting network failure events, where the plurality of customer impacting network failure events comprises both hardware failure events and software failure events associated with a router;
   computing a mean time between outage metric from the plurality of customer impacting network failure events; and
   comparing the mean time between outage metric with a mean time between outage goal metric, wherein the mean time between outage goal metric is calculated in accordance with a predicted mean time between failure metric, wherein the mean time between outage goal metric is expressed as:

$$MTBO \text{ GOAL METRIC} = \frac{m_{LC} m_{RP}}{(1-c)(m_{LC} + m_{RP})},$$

where $m_{LC}$ represents a predicted mean time between failure for an access line card, $m_{RP}$ represents a predicted mean time between failure for a route processor card, and c represents a coverage factor.

20. A system for measuring a customer impacting failure rate in a communication network, comprising:
   a processor configured to:
   collect a plurality of customer impacting network failure events, where the plurality of customer impacting network failure events comprises both hardware failure events and software failure events associated with a router;
   compute a mean time between outage metric from the plurality of customer impacting network failure events, wherein the mean time between outage metric is expressed as:

$$MTBO \text{ METRIC} = N \times \frac{T}{F}$$

where, T represents a time period, N represents a total number of access line cards in the communication network for the router, and F represents a total number of equivalent access line card failures during the time period T; and
   compare the mean time between outage metric with a mean time between outage goal metric, wherein the mean time between outage goal metric is calculated in accordance with a predicted mean time between failure metric.

* * * * *